June 20, 1967
E. A. BONIFACE
3,327,067
COCKPIT SOUND RECORDER
Filed Feb. 4, 1963
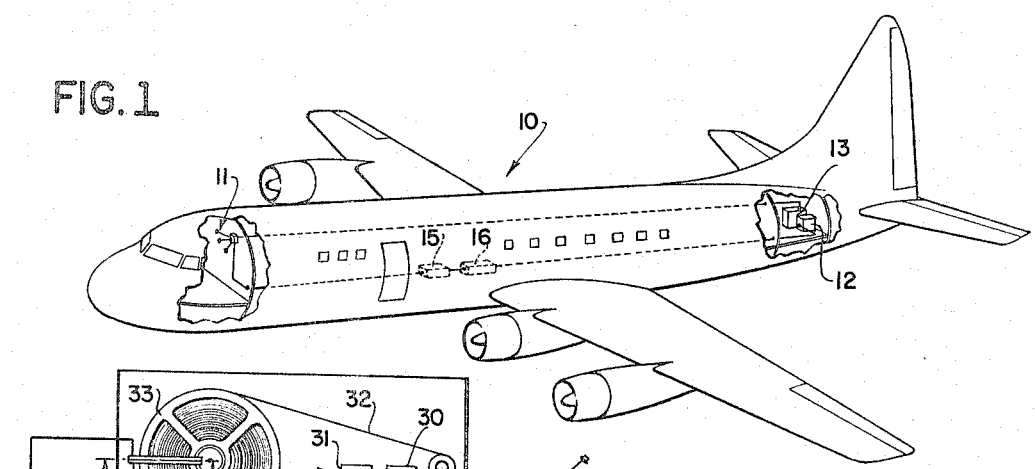
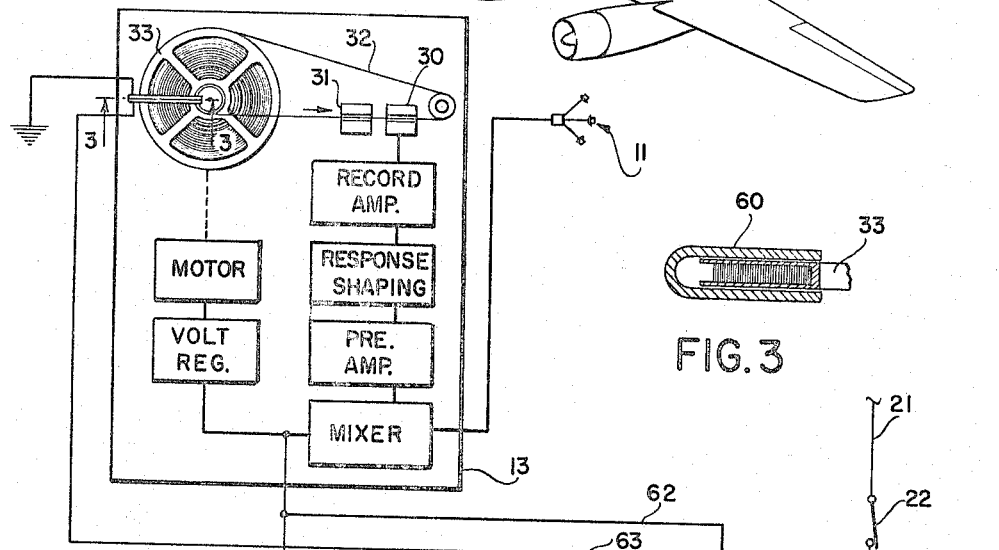
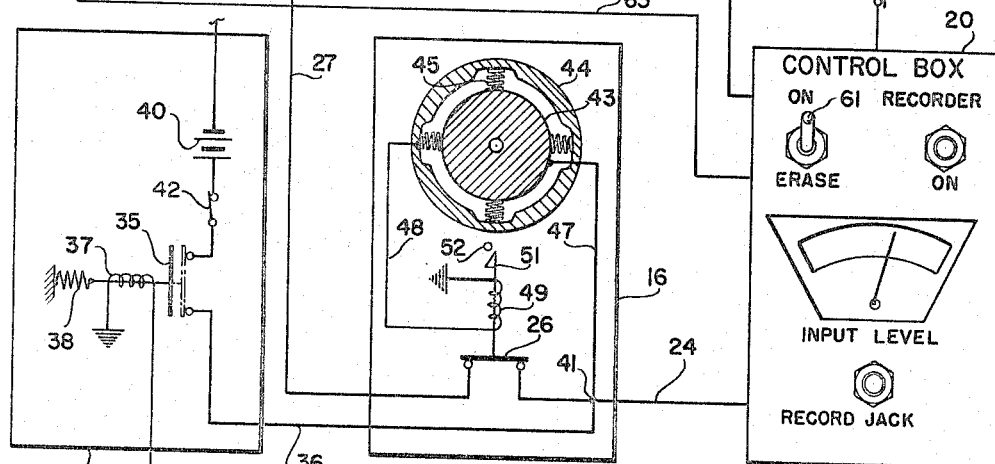
INVENTOR.
EDMUND A. BONIFACE
BY
George C. Sullivan
Agent

United States Patent Office 3,327,067
Patented June 20, 1967

3,327,067
COCKPIT SOUND RECORDER
Edmund A. Boniface, Encino, Calif., assignor to Lockheed Aircraft Corporation, Burbank, Calif.
Filed Feb. 4, 1963, Ser. No. 256,502
2 Claims. (Cl. 179—100.2)

The present invention relates to a device to record the sounds in an airplane cockpit and is a continuation-in-part of my co-pending application entitled, "Aircraft Cockpit Sound Recorder," filed Feb. 2, 1961 and bearing Ser. No. 86,681, now abandoned.

To accurately determine the causes of an aircraft accident, it is valuable to record the events just prior to the accident. In-flight recorders which make a record of the aircraft's course, altitude and time in flight have been an invaluable aid in helping to analyse the causes which lead to an airplane crash. However valuable this information is, it is incomplete without information to the pilot's reaction and other sounds in and around the cockpit.

It is therefore an important object of this invention to provide a means to record the voices of the persons in the cockpit and any other sounds which might make their way to the front of the aircraft. Microphones placed in the cockpit cause magnetic recording means in a shockproof, waterproof and fireproof container in a location remote from inflammables carried by the aircraft, to record any sound in and around the front of the aircraft.

Because the recording device must be carried in a shockproof and fireproof container, it is not feasible to remove and replace the recording medium after every flight; at the same time it is necessary to keep a running account of the events that might lead up to the accident. In other words the sounds which occur in a cockpit during the just completed flight must always be available.

It is therefore another important object of this invention to provide a continuous recording means which will record sound which, if no accident occurs, will be erased after a fixed or predetermined period of time.

While pilot personnel recognize the desirability of recording sounds in and around the cockpit just prior to an aircraft accident, so that the causes of the accident might be determined, and steps taken as a result to improve the safety of the flight, they object to having those sounds available for others to listen to if there is no accident. While a continuous erase and record means discussed in the last paragraph have alleviated part of the objection of the pilot personnel there still remains the last interval of sounds recorded on the tape even though no accident occurs.

It is therefore another object of this invention to provide a means by which pilot personnel may erase all sound intelligence on the magnetic recording medium upon the completion of any flight where there has been no need to save those sounds due to an accident or otherwise. A large size flux producing means adjacent the storage reel or roll for the magnetic recording medium may be energized by a switch in the cockpit so that at the completion of a safe flight the pilots may eradicate all sound on the medium.

In instances there may be an electrical fire leading up to the accident, the sounds of which are to be recorded. In such situations it is normal emergency procedure to "hit the crash bar" or disconnect the main source of electrical power from the major aircraft components. It is however even more important to have available a record of sounds during this period.

It is therefore another important object to connect the recording means to an emergency source of electrical power when it is necessary to disconnect the main source during flight.

In the case of an accident it is possible and probable that the aircraft power source will remain connected to the sound recorder so that it will continue to run. With nothing more, the erase head would eradicate all sound of the events leading up to the accident. It becomes desirable to eliminate the effects of the erase mechanism and to prevent any further movement of the recording medium in order to preserve the intelligence thereon.

It is therefore another important object of this invention to provide an impact switch means which will stop all further movement and thus any further erasing of the recording medium.

Further objects and advantages of the invention will become apparent from the reading of the following specification and claims taken in conjunction with the appended drawings wherein:

FIGURE 1 is a view of a typical aircraft showing the components of the invention.

FIGURE 2 is a schematic of the components of the invention.

FIGURE 3 shows the end-of-flight erase means.

In FIGURE 1 a typical aircraft 10 is shown with a plurality of microphones 11 in the cockpit. The in-flight recording means 12, for recording flight data, and the sound recording device, located within container 13, of the present invention are shown in the aft end of the fuselage. This position has been found by experiment to be least affected by fire and damage due to impact. The in-flight recorder 12 and the sound recorder within sealed container 13 are both shock mounted, fireproofed and made watertight. Located in the fuselage is an emergency power source 15 and an impact switch 16 which will be described in detail later.

The control box 20 is located in the cockpit 14 and has appropriate instruments to indicate that the record is on and to show the recording input level. When the main power source, either DC or AC, is supplied to the aircraft via line 21 to operate radios and other electrical instruments, the switch 22 which is controlled by the presence of power in this electrical system is automatically closed supplying the source of power to the sound recording and erase mechanisms. When switch 22 is closed the power on line 21 is applied to the line 24. Switch plate 26 and line 27 carry the power to the sound record mechanism in container 13.

The container 13 is not only shock resistant and fire resistant but is sealed in such a manner as to be watertight and capable of withstanding extreme temperatures during a crash fire. In the container 13 there is a motor 23 having the usual voltage regulator 25 for speed control, a mixer 28 to accept and mix the sounds from the plurality of open microphones 11, a preamplifier 29, a shaper 39 and a record amplifier 36 connected to the record heads 30. Just prior to the record heads 30 are erase heads 31 through which the magnetic recording medium 32 could be transported prior to having intelligence being impressed thereon. The recording medium 32 is shown here as a magnetic tape. It will of course be understood that recording medium 32 may be also wire with no change in components or scope of the invention. The recording medium 32 is wound on the reel 33 from the outside and winds off from the inside to the erase and record heads 31 and 30.

If the events which lead up to the crash were preceded by an electrical fire it would still be desirable to record the sounds which occurred in the cockpit of the aircraft. In the event of an electrical fire it is normal emergency procedures to disconnect the main power source from the aircraft electrical system. This automatically opens the switch 22. Normally flight will continue in situation such as this. However, without more, the sound recording device in container 13 would be stopped. Therefore, an emergency power source 15 is provided to keep the sound recording device operating until terminated by some other means. This source comprises battery 40 which is connected through solenoid switch 35 to the recorder. Normally closed solenoid switch 35 is in the emergency power source 15 and is opened when a source of power is applied thereto; this power is directly supplied from the aircraft electrical system via line 34, so that when there is power in the electrical system the switch 35 is held open by solenoid 37.

When the main power source is disconnected from the aircraft electrical system because of an electrical fire, or when power fails, the switch 22 is opened, and also, the power to solenoid 37 is cut off, allowing spring 38 to close switch 35. Thus the emergency DC power source 40 will continue to supply a source of power to the switch plate 26 and the line 27 to the record mechanism container 13. Switch 42 disconnects battery 40.

When the crash occurs the impact switch 16 opens both the main electrical power source and the emergency power source circuit to the recorder in container 13 so that it can no longer operate and thus erase whatever intelligence has been recorded on the magnetic recording medium 32. The impact switch 16 includes an inertia mass 43 held away from a contact ring 44 by a plurality of springs 45. The main power source is connected through line 24 from point 41 and line 47 to the inertia mass 43. The contact ring 44 is connected to ground through line 48 and the solenoid 49. The armature of solenoid 49 has a hook 51 on its upper end which will hook over the latch 52 when the solenoid 49 is energized by contact of the inertia mass 43 with the contact ring 44 to complete a circuit from the main power source or the emergency power source at point 41 as the case may be.

Upon uneventful landing, when the pilot personnel desire to erase whatever intelligence has been recorded upon the medium 32 a second erase means 60 is provided at the storage reel 33. The erase means 60 is a soft core magnetic flux producing device which will reorient all of the magnetic intelligence impressed upon the recording medium 32 whether it is wire or tape. A spring loaded switch 61 biased to the "on" position may be moved to the lower or erase position to close the circuit from the line 27 and line 62 through the switch to line 63 to the erase device 60. The provision of supplying a power source from the line 27 for the erase means 60 prevents intentional erasure after an accident in an effort to destroy incriminating evidence.

The recording medium 32 may be of any length desired, usually not longer than that required for the duration of flight of aircraft 10 but for purposes of size and space will probably be limited to a length to continuously record only the last few minutes of flight, the time period being determined from a study of average lengths of emergencies leading up to such accidents.

Having disclosed the details of my invention, I claim the following combinations and their equivalents as my invention:

1. A recording assembly for an aircraft having an electrical power distribution system, comprising:
   a fireproof, watertight, shockproof, sealed container in said aircraft remotely located with respect to inflammables carried by said aircraft;
   a reel-supported endless magnetic recording medium in said sealed container;
   a magnetic recording head disposed adjacent a loop portion of said recording medium to permit a signal to be recorded thereon before it is wound onto said reel;
   drive means in said sealed container for transporting said loop portion of said recording medium from said reel past said recording head and thence back onto said reel;
   an automatic erase head disposed adjacent said magnetic medium and near said recording head so as to continuously and automatically erase that portion of said recording medium immediately preceding said recording head;
   recording amplifier means for supplying a recording signal to said recording head;
   a main source of electrical power external of said sealed container;
   control means responsive to connection of said main source of electrical power to said power distribution system to energize said drive means and said recording amplifier means via a common power junction;
   an emergency source of electrical power;
   emergency circuit means to connect said emergency source of electrical power to said drive means and said recording amplifier means, via said common power junction, in the event of an interruption of said main source of electrical power;
   impact switch means interposed between said common power junction and said control means, said impact switch means being responsive to a high G load imposed on said aircraft to open the power circuit between said electrical power sources and said common power junction and thereafter maintain said power circuit in an open condition;
   a normally inoperable magnetic flux device of generally U-shaped configuration disposed about said reel along a radial line extending outwardly from the center of said reel;
   a bulk erase circuit for energizing said flux device; and
   a manual switch connected between said control means and said bulk erase circuit, whereby said medium may be erased substantially in its entirety by closing said switch, and whereby it is impossible to erase said recording medium by closing said manual switch after said impact switch means has been opened.

2. A recording assembly for an aircraft having an electrical power distribution system, comprising:
   a fireproof, watertight, shockproof sealed container in said aircraft remotely located with respect to inflammables carried by said aircraft;
   an endless loop of magnetic recording material located in said sealed container;
   a magnetic recording head disposed adjacent said loop to permit a signal to be recorded thereon;
   means for selectively driving said loop past said recording head;
   an automatic erase head disposed adjacent said loop at a location, with respect to said recording head, which will permit said erase head to continuously and automatically erase that portion of said loop immediately preceding said recording head;
   recording amplifier means for supplying a recording signal to said recording head;
   a main source of electrical power;
   a power terminal;
   control means responsive to the energization of said power distribution system by said main source of electrical power, to apply power to said power terminal;
   an emergency source of electrical power;
   emergency circuit means responsive to the energization of said power distribution system by said main source of electrical power, to disconnect said emergency source of electrical power from said power terminal, and to connect said emergency source of electrical power to said power terminal in the absence of energization of said power distribution system by said main source of electrical power.
   self-latching impact switch means interposed between said power terminal and said power sources, said impact switch means being responsive to a high G load imposed on said aircraft to open the power circuit between said electrical power sources and said power terminal;

open microphone means in the cockpit of said aircraft to pick up cockpit sounds and transmit them to said recording amplifier means;

a normally inoperable soft-core magnetic flux device disposed about the major portion of said loop so as to permit the bulk erasure thereof;

a bulk erase circuit for operating said flux device; and a manual switch interposed between said power terminal and said bulk erase circuit, whereby said magnetic recording material may be erased substantially in its entirety by closing said manual switch, and whereby it is impossible to erase said magnetic recording material by closing said manual switch after said impact switch means has become self-latched.

References Cited

UNITED STATES PATENTS

| 2,426,838 | 9/1947 | Miller | 242—55.19 |
| 2,848,660 | 8/1958 | Boyers | 179—100.2 |
| 2,992,296 | 7/1961 | Albrecht | 179—100.2 |

BERNARD KONICK, *Primary Examiner.*

A. I. NEUSTADT, *Assistant Examiner.*